H. E. MORGAN.
HOSE CONNECTION FOR AIR OR WATER.
APPLICATION FILED JUNE 27, 1916.
1,251,086.
Patented Dec. 25, 1917.
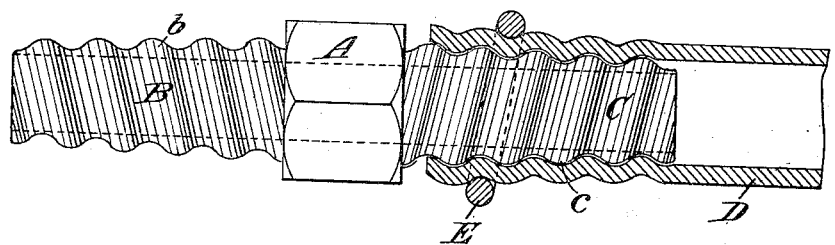
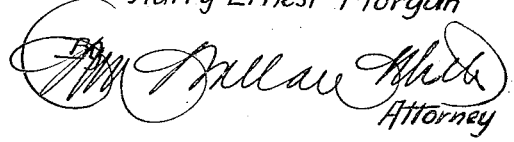
Inventor
Harry Ernest Morgan
Attorney

UNITED STATES PATENT OFFICE.

HARRY ERNEST MORGAN, OF NEWTOWN, NEW SOUTH WALES, AUSTRALIA, ASSIGNOR TO JAMES ROBERT QUILTY, OF ABBOTSFORD, NEW SOUTH WALES.

HOSE CONNECTION FOR AIR OR WATER.

1,251,086.

Specification of Letters Patent.

Patented Dec. 25, 1917.

Application filed June 27, 1916. Serial No. 106,140.

*To all whom it may concern:*

Be it known that I, HARRY ERNEST MORGAN, subject of the King of Great Britain and Ireland, residing at 15 L'Avenue, Newtown, New South Wales, Australia, have invented new and useful Improvements in Hose Connections for Air or Water, of which the following is a specification.

In its simplest form, the appliance consists of a tube with faces like a nut on or near its center adapted to receive a spanner, whereby the appliance can be screwed up, as required; projecting from the nut in one or more directions, the tube will be tapered externally, with a screw-thread on the external surface. One of these screw threads will be screwed into the loose end of a hose pipe, on which is a loose ring which will cause the hose pipe to be bound on to the taper plug within.

In the accompanying drawings:—

The figure shows the hose connection and nut in elevation, the hose pipe and ring being in section.

In the figure, A is the central nut, whence project, in opposite directions, the two tubes B and C, which are externally tapered; the exteriors of the tapered projections will be threaded with coarse rounded threads $b$, $c$, upon which the ends of the hose pipes D will be screwed and then locked by screwing up the rings E until they jam.

The connections may be made in different sizes to suit the different diameters of the flexible pipes that are to be connected. It is obvious that the internal bore through the nut and the externally tapered tubes will approximately be the same as the internal diameters of the hose pipes that are to be connected.

I claim:

1. A junction for hose pipes comprising a tapered tube provided with a coarse rounded thread and adapted to be screwed forcibly into the end of a hose, and a closed rigid ring of substantially circular cross section the diameter of which is substantially equal to the average width of the space between the turns of the thread, adapted to be mounted on said end of the hose, whereby either of the junction parts may be moved spirally relative to the other to cause the ring to coact with the successive portions of the thread on the tube to press the hose against the tube to form a tight joint.

2. A junction for hose pipes consisting of a nut with two tubes projecting therefrom on opposite sides but in the same axial line, the tubes having externally tapered surfaces and the tapered surfaces being threaded with coarse rounded threads adapted to be screwed into the ends of two hose pipes so that the two may make one, and rigid closed rings to be applied outside the hose pipe ends for locking the hose pipe ends upon the junction, the rings being of substantially circular cross section the diameter of which is substantially equal to the average width of the space between the turns of the thread, as and for the purposes specified.

In testimony whereof I have signed my name to this specification in the presence of two subscribing witnesses.

HARRY ERNEST MORGAN.

Witnesses.
A. MASSEY,
H. C. CAMPBELL.

Copies of this patent may be obtained for five cents each, by addressing the "Commissioner of Patents, Washington, D. C."